(No Model.)

E. E. YOUNG.
CARD GAME PROMOTING THE STUDY OF LANGUAGE.

No. 422,682.          Patented Mar. 4, 1890.

WITNESSES:
John W. Deamer
C. Sedgwick

INVENTOR:
E. E. Young
BY Munn & Co.
ATTORNEYS.

UNITED STATES PATENT OFFICE.

EFFIE E. YOUNG, OF ORANGE, NEW JERSEY.

CARD GAME PROMOTING THE STUDY OF LANGUAGE.

SPECIFICATION forming part of Letters Patent No. 422,682, dated March 4, 1890.

Application filed August 27, 1888. Serial No. 283,920. (No model.)

*To all whom it may concern:*

Be it known that I, EFFIE E. YOUNG, of Orange, in the county of Essex and State of New Jersey, have invented a new and Improved Card Game Promoting the Study of Language, of which the following is a full, clear, and exact description.

My invention relates to a card game designed to combine the study of language with amusement, and has for its object to provide a simple inexpensive game of this character which may be played by grouping the cards to form sentences or in a variety of ways, and will facilitate both the teaching and learning of a native or foreign language.

The invention is embodied in cards bearing a novel arrangement of words and characters on their faces, all as hereinafter described and claimed.

Reference is to be had to the accompanying drawings, forming a part of this specification, in which similar letters of reference indicate corresponding parts in all the figures.

Figure 1:
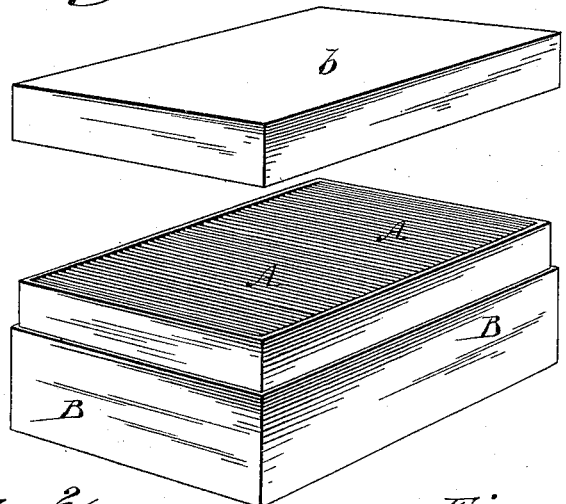
Figure 2:
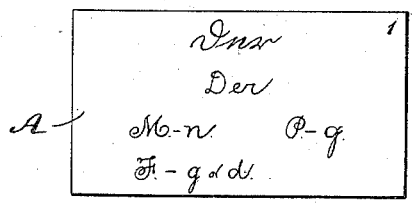
Figure 3:
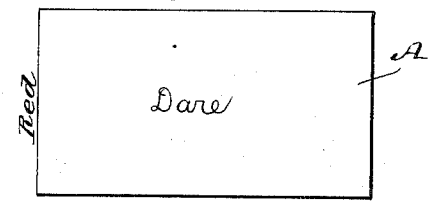
Figure 4:
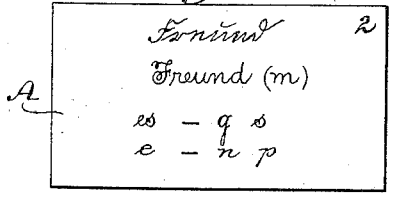
Figure 5:
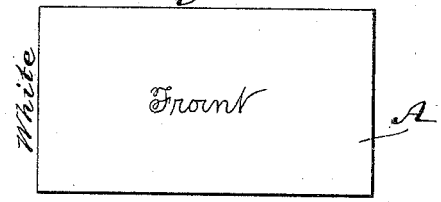
Figure 6:
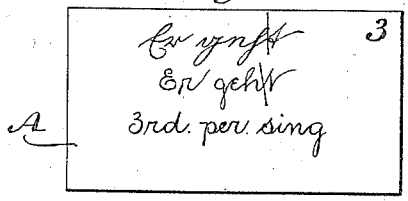
Figure 7:
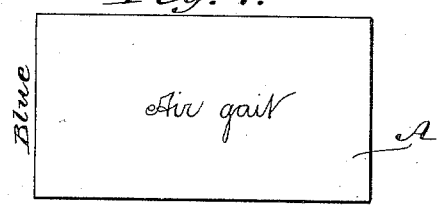

Figure 1 is a perspective view of an open box filled with cards prepared in accordance with my invention. Figs. 2, 4, and 6 are face views of one side of three of the cards; and Figs. 3, 5, and 7 are reverse side or face views of these cards.

I will hereinafter more particularly describe the card game as adapted for the study of a foreign language; but it will be understood that in so far as some features of the invention are concerned the game may be advantageously employed to give one or more persons a more thorough and correct knowledge of their own native language.

The game, as shown, consists of any desired number of cards A of convenient size, having a word or words of a foreign language produced on their faces in characters of the familiar and foreign languages and in a peculiar manner or arrangement hereinafter explained. There may be anywhere from one hundred cards or less to ten thousand or more cards in the game, and the cards will be packed in a suitable box B, having a cover *b*, and which will be labeled to indicate or identify its contents, the box and cards presenting similar external appearance to many other card games in common use, and as clearly shown in Fig. 1 of the drawings.

The three samples of cards shown are for the use of those speaking or understanding the English language to obtain a knowledge of the German language; but it is obvious that a card game may be arranged on the principles underlying this invention for the study of any one language by those understanding a different language.

On one face of each card of the series there is produced by printing, writing, or otherwise, and in the characters of the language of the learner or player, a word or words of the language to be learned, and on the reverse side or face of the card there is produced in characters familiar to the student or player the phonetic equivalent of said word or words. This feature of the game-cards enables the player to always give the practically-correct pronunciation of the word or words of the foreign language by referring to the back of the card. I purpose producing this phonetic representation of the word or words on each card in a different color from that in which they are produced on the other or first-mentioned side in the correct spelling of the foreign word. For instance, the first card A (shown in reverse in Figs. 2 and 3 of the drawings) has produced on one side or face "Der" in English characters and meaning the English article "The," and on the reverse side or face is produced in English characters "Dare," which is the correct phonetic representation of "Der" when it is used in the manner or sense indicated by the grammatical elucidation of the German word expressed in abbreviations readily understood, and preferably at the lower part of the card under "Der," as shown in Fig. 2, and as will be hereinafter more fully explained. In this instance the word "Der" at one face of the card would be printed or otherwise produced in black letters, and the phonetic "Dare" on the other face of the card would be printed in red letters or in any other readily-distinguishable different color. These different colors of the words and their phonetic equivalents are important, in that it will be understood by the players that the word proper always appears in one color, while its phonetic equivalent always appears in the other color, thus preventing the pupils mistaking the phonetic equivalent for the word itself. This principle of the invention is also carried out in the other two cards, the second card (shown in Figs. 4 and 5 of the drawings) having produced on one face the German word "Freund," meaning the English noun "Friend," and on the reverse side of this card is produced, preferably in a different color, the phonetic equivalent "Froint." The third card bears on one face the words "Er geht," meaning "He goes" in English, and at its other face is produced "Air gait," the phonetic equivalent giving the correct pronunciation.

I am not limited to placing the phonetic equivalent of the word or words on the reverse faces of the cards, as both the words and their phonetic equivalents may be produced on the same sides or faces of the cards and in the same or a different color; but the arrangement shown and above described is preferred in practice.

On one face of each card, and preferably that face bearing the word of the foreign language correctly spelled in the characters of the learner's language, is also written or produced the word or words of the card in the characters of the language to be learned, „Der," „Freund," and „Er geht" thus appearing on the three cards, respectively, and preferably over "Der," "Freund," and "Er geht." This last-named feature of the invention is valuable independently of the production of the phonetic equivalents of the word or words on the faces of the cards; but the word or words produced in the characters of the familiar and foreign languages and correctly spelled, combined with their phonetic equivalents, the latter produced on the cards, and preferably at their reverse sides or faces, is a much more desirable arrangement for promoting a quicker and more thorough acquisition of the foreign language.

Another distinctive feature of my invention consists in the production on the face of each card of the grammatical elucidation of the word or words produced on the card either in the familiar characters of the language of the learner only or in such characters and also the characters of the language to be learned. This grammatical elucidation presently to be explained is produced, preferably, on the main faces of the cards having the word or words produced thereon in correct orthography in one or both languages. In the examples shown the card having "Der" on it will also have on it the grammatical elucidation thereof, and preferably in abbreviations readily understood by the card-player, as "M-n, F g or d, P-g," which indicate that the word "Der" may be used before a masculine noun, indicated by "M," and in the nominative case, indicated by "n," and that said word "Der" may be used before a feminine noun, indicated by "F," when in the genitive or dative case, indicated by "g" or "d," and that said word "Der" may be used before a plural noun, indicated by "P," in any gender in the genitive case, indicated by "g." The card having "Freund" on it also has an "m," in parentheses, indicating that "Freund" is a masculine noun, and the termination "es," with "g s" on the card, indicates that by adding "es" to "Freund" the genitive singular is formed, and the termination "e," with "n p," indicates that by adding "e" to "Freund" the nominative plural is formed. The card having "Er geht" on it, with a line between "h" and "t," indicates that the root is "geh," and that the "3rd person singular" written below "Er geh" is formed by adding "t" to the root, making "Er geht," as shown. By thus placing before the eye of the card-player the required grammatical elucidation of any word every time the word is seen on a card the use of a dictionary or language text-book is not necessary, and the words with their full meanings will be much more easily learned. In fact, it would be quite inconvenient and tiresome and would require too much time to consult text-books; hence the interest in the game by advanced students giving special attention to the grammatical correctness of words built up to form sentences in playing the game would fail, and the benefits desired by them from the game would not be attained were the grammatical elucidations omitted from the cards, although for younger students the interest in the game may be maintained by using cards devoid of these elucidations, or those having only the correct orthographical and the phonetical representations of the word or words on one or both faces.

Another distinctive feature of the invention consists in using cards of one color only for each part of speech of the language to be learned, thus materially assisting the card player or student, as the colors of the cards he holds will indicate to him the several parts of speech, and he will not confound a noun with an article or verb, and this arrangement also provides for the more ready mastery of any difficulty attending the study of any particular part of speech, as the cards bearing words of this class can readily be selected by their color alone and by a player ignorant at the time of the meaning of the words. The colors also serve as an incidental help to the memory of the student. As examples, the first card shown in the drawings is red, as indicated at the left-hand end of Fig. 3, the second card is white, as indicated at the left hand of Fig. 5, and the third card is blue, as indicated at the left hand in Fig. 7.

I purpose providing with each game a representative set of cards of each of the principal difficulties in each language—as, for instance, a verb conjugated, each card showing its person, number, gender, mood, and tense. I will also provide duplicate cards having produced on them simple words in more general use, such as the articles "a" and "an," and the words "the," "it," &c., in order to facilitate the comparatively quick building up of sentences by a grouping of cards by the successive players of the game.

Another feature of the invention consists in giving cards bearing the most simple words, which may be used without fear of seriously incorrect results, a certain mark which will distinguish them from cards bearing other more difficult words requiring more or less study to understand them. This arrangement divides the cards into "series," which may be distinguished from each other by any graduated marks indicating the progressive difficulties attending the study of the words. For instance, I may use numbers to indicate these characteristics of the word-cards, the card having "Der" on it being marked 1, the card bearing "Freund" being marked 2, and the one bearing "Er geht" being marked 3, it being understood that all other cards in the game bearing words not more difficult of acquirement than the word "Der" will be also marked 1. Those bearing words not more difficult than the word "Freund" will be marked 2, and those bearing more words of the same grade or difficulty of acquirement as "Er geht" will be marked 3, and so on, all words of the same grade as regards the ease or difficulty of their acquirement being thus distinguished by the same number or mark, thus grouping the cards in series, which may at any time be selected when any particular difficulty presents itself, that it may by more direct efforts be quickly and thoroughly mastered. It is also my purpose to provide with each card game a pamphlet "key" containing many or all of the words of the game and tables of their conjugations, declensions, derivations, &c., and rules for the use of words and construction of sentences, allowing the game to be readily played by junior or advanced students without reference to any other dictionary or text-book.

The game may be played by younger or older students of a foreign language in a variety of ways, as may be suggested by the judgment or fancy of the teacher or learner, one good way for beginners being to shuffle the cards and deliver a number—say four—to each player, it being advisable to select those cards bearing the "serial" numbers or marks indicating that they carry ordinarily simple words. If the language to be learned—German, for instance—is known by one of the players, he may explain the meanings of the words on the distributed cards; but if all the players are novices the key will be consulted to get their full meaning. Each player now understanding the words on the cards he holds, one player will lay down a card, pronouncing the word or words on it and giving its or their meaning as he does so. The next player in turn will, if he can, lay next the first card one bearing a word or words making a sensible combination with the word or words of the first card, pronouncing and defining such words as he does so, and also interpreting the meaning of the words or phrase or sentence thus far formed. If the second player has no card or cards he can use to make sensible word combinations with the first card laid down, he must draw from the pile or number of undistributed cards until he secures a card which he can play in this manner, and the next players proceed in like manner, each playing one or more cards, as he may be able to do in constructing a complete phrase or sentence. When one player has used all his cards, he is the victor of the first round, and the number of cards held by the other players will be counted and placed to his credit. At the end of the first round the cards which have already been played will be shuffled and redistributed, giving each player a different hand. Explanations by one player or from the key having again been secured, a second round will be played like the first one, and thus any required number of rounds will be played until the victor has to his or her credit a certain predetermined number of cards.

When the players already have some knowledge of the language being studied in the card game, the grammatical elucidations indicated on the card will be brought into requisition in some particular predetermined manner. For instance, if a player held an infinitive verb, he might be allowed to use it in any person, mood, or tense he wished; if a noun, he might use it in any number or case, and all these features may be regulated by a general requirement that some particular mood, tense, &c., is to be used. However the game may be played, a mistake in formation, construction, pronunciation, or interpretation would oblige the culprit to draw from the reserve fund of cards, thus lessening his chances of playing all his cards and being the victor of any round or of the game.

By the aid of this card game a large vocabulary can be easily and quickly gained and with prospect of remembering it, as each word as learned is put to immediate practical and agreeable use in a much greater variety of ways than would be possible in study from ordinary text-books, and as a preparation for correct conversation it is valuable, as each player and student is constantly called upon to form entirely new sentences.

While the game presents an agreeable pastime, it calls for beneficial mental effort of service not only to a teacher of foreign language, but also to the student player in grounding himself in the principles of the language, and it is believed that a much larger amount of thoughtful repetition of words and their meanings can be secured by the playing of this game than most people will give to the contents of a text-book.

The use of this card game in the study of one's own or native language is most beneficial in acquiring correct use of words and in promoting proficiency in composition or conversation, as will readily be understood.

Having thus described my invention, what I claim as new, and desire to secure by Letters Patent, is—

1. In a game device or pack of cards, a number of cards bearing a word or words of a language, and also the phonetic equivalent of said word or words, substantially as herein set forth.

2. In a game device or pack of cards, a number of cards bearing a word or words of a language, also the phonetic equivalent of said word or words, and also the grammatical elucidation of the word or words, substantially as herein set forth.

3. In a game device or pack of cards, a number of cards bearing a word or words of a language, and also bearing in a different color the phonetic equivalent of said word or words, substantially as herein set forth.

4. In a game device or pack of cards, a number of cards, each having a word of a language printed on one side and the phonetic equivalent of such word in another language, both the word and equivalent being printed in different color, as shown and described.

5. In a game device or pack of cards, a number of cards bearing a word of a language, and those which bear parts of speech of the same class or kind being of like color for ready identification, as shown and described.

6. In a game device or pack of cards, a number of cards bearing a word or words of a language and marks indicating their classification in series, according to difficulty of use in each sense in which the said word or words may be used, as specified.

7. In a game device or pack of cards, a number of cards bearing a word or words and the grammatical elucidation of such word or words, as set forth.

EFFIE E. YOUNG.

Witnesses:
 HENRY L. GOODWIN,
 C. SEDGWICK.